United States Patent
König et al.

(10) Patent No.: US 8,383,757 B2
(45) Date of Patent: Feb. 26, 2013

(54) DEVICE AND METHOD FOR DEGASSING SOLVENT-CONTAINING POLYCARBONATE SOLUTIONS

(75) Inventors: Thomas König, Leverkusen (DE); Klemens Kohlgrüber, Kürten (DE); René De Cleyn, Wuustwezel (BE); Johan Vaes, Kalmthout (BE); Johan Vanden Eynde, Zwijnaarde (BE); Dirk Van Meirvenne, Langenfeld (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 13/318,487

(22) PCT Filed: May 26, 2010

(86) PCT No.: PCT/EP2010/003208
§ 371 (c)(1),
(2), (4) Date: Jan. 10, 2012

(87) PCT Pub. No.: WO2010/139414
PCT Pub. Date: Dec. 9, 2010

(65) Prior Publication Data
US 2012/0108782 A1    May 3, 2012

(30) Foreign Application Priority Data
May 30, 2009  (EP) .................................... 09007268

(51) Int. Cl.
*C08G 64/00*  (2006.01)
*C08G 63/02*  (2006.01)

(52) U.S. Cl. .......... 528/196; 159/2.2; 159/2.3; 264/219; 528/198

(58) Field of Classification Search .................... 159/2.2, 159/2.3; 264/219; 528/196, 198
See application file for complete search history.

(56) References Cited

U.S. PATENT DOCUMENTS

| | | | |
|---|---|---|---|
| 2,964,513 A | 12/1960 | Dale | |
| 3,450,183 A | 6/1969 | Hinton | |
| 3,458,494 A | 7/1969 | Scoggin | |
| 3,741,272 A | 6/1973 | Ullrich et al. | |
| 4,312,642 A | 1/1982 | Lehr et al. | |
| 4,906,329 A | 3/1990 | Tominari et al. | |
| 5,283,021 A | 2/1994 | Shih | |
| 5,708,133 A | 1/1998 | Higuchi et al. | |
| 6,353,088 B1 | 3/2002 | Fujitaka et al. | |
| 6,534,619 B1 | 3/2003 | Elsner et al. | |
| 6,620,906 B1 | 9/2003 | Elsner et al. | |
| 6,811,294 B1 | 11/2004 | Elsner et al. | |
| 6,949,622 B2 * | 9/2005 | Silvi et al. | 528/481 |
| 2001/0056176 A1 | 12/2001 | Takami et al. | |
| 2003/0176636 A1 | 9/2003 | Liesenfelder et al. | |
| 2005/0092444 A1 | 5/2005 | Kohlgruber | |
| 2005/0234219 A1 | 10/2005 | Silvi et al. | |
| 2011/0141843 A1 | 6/2011 | Bierdel et al. | |
| 2011/0160381 A1 | 6/2011 | Konig et al. | |
| 2012/0123084 A1 * | 5/2012 | Konig et al. | 528/196 |

FOREIGN PATENT DOCUMENTS

| | | |
|---|---|---|
| DE | 29 08 352 A1 | 9/1980 |
| DE | 100 16 894 A1 | 10/2001 |
| DE | 103 33 577 A1 | 2/2005 |
| DE | 10 2008 029 305 | 12/2009 |
| DE | 10 2008 029 306 | 12/2009 |
| EP | 027 700 A2 | 4/1981 |
| EP | 0 257 520 A2 | 3/1988 |
| EP | 0359432 A2 | 3/1990 |
| EP | 0 924 224 A1 | 6/1999 |
| EP | 1113 848 A1 | 7/2001 |
| EP | 1 165 302 A1 | 1/2002 |
| EP | 1 265 944 A1 | 12/2002 |
| EP | 1 510 530 A1 | 3/2005 |
| GB | 1330890 A | 9/1973 |
| JP | 05017516 A | 1/1993 |

OTHER PUBLICATIONS

Schnell, "Chemistry and Physics of Polycarbonates", Polymer Reviews, vol. 9, Interscience Publishers, New York, London, Sydney 1964, pp. 33-70.
"Der gleichläufige Doppelschneckenextruder" [The Corotatory Twin-Screw Extruder], Klemens Kohlgrüber, Carl Hanser Verlag, ISBN 978-3-446-41252-1, on pp. 193-195.
Bierdel et al., "Co-Rotating Twin-Screw Extruders—Fundamentals, Technology and Applications", pp. 183-184 Carl Hanser Publishers, Munich (2008).
Young et al., "Taste and Odour Threshold Concentrations of Potential Potable Water Contaminants", Wat. Res. vol. 30, No, 2, pp. 331-340 (1996).
H. Burttschel et al., J. Am. Water Works Assoc., 51:205(1959) "Chlorine derivative of phenol causing taste and odor" and C. Joll et al., Curtin University of Technology, Centre for Applied organic Geochemistry, "The Chemistry of Halophenol Tastes in Perth Drinking Water".

* cited by examiner

*Primary Examiner* — Terressa Boykin
(74) *Attorney, Agent, or Firm* — Novak Druce Connolly Bove + Quigg LLP

(57) ABSTRACT

The invention relates to an apparatus and a process for devolatilizing solvent-containing polycarbonate solutions. By employing the inventive apparatus, polycarbonates with low residual values of volatile constituents are produced from solvent-containing polymer melts, which improved optical properties, especially yellowness index, with the aid of an apparatus combination of a heatable tubular devolatilizer and a vented extruder.

14 Claims, 2 Drawing Sheets

DEVICE AND METHOD FOR DEGASSING SOLVENT-CONTAINING POLYCARBONATE SOLUTIONS

PRIORITY

Figure 1:
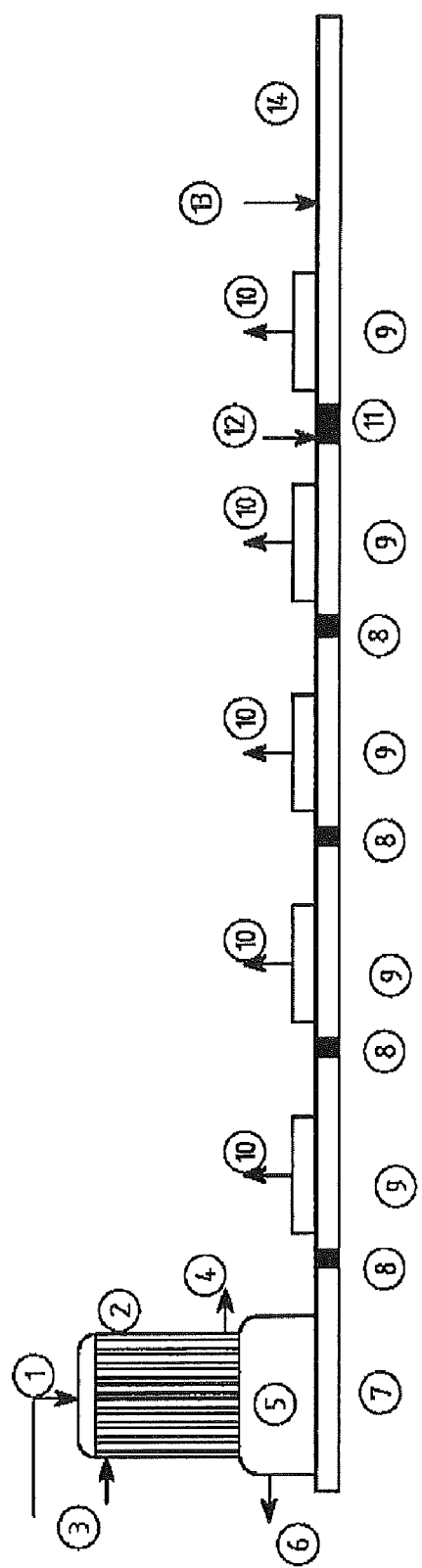

Priority is claimed as a national stage application, under 35 U.S.C. §371, to PCT/EP2010/003208, filed May 26, 2010, which claims priority to European application 09007268.7, filed May 30, 2009. The disclosures of the aforementioned priority applications are incorporated herein by reference in their entirety.

The invention relates to an apparatus and a process for devolatilizing solvent-containing polycarbonate solutions. By employing the inventive apparatus, polycarbonates with low residual values of volatile constituents are produced from solvent-containing polymer melts, which improved optical properties, especially yellowness index (YI), with the aid of an apparatus combination of a heatable tubular devolatilizer and a vented extruder.

In the known interfacial process for preparing polycarbonates, solvents such as aromatic chlorohydrocarbons, especially dichloromethane are used, the residual contents thereof in the end product being unwanted since they are disruptive in the polycarbonate. In order to remove these volatile constituents, the vented extruder has to be operated at relatively high temperatures by the processes known from the prior art, which gives rise to thermal damage, and this has the disadvantage of worsened optical properties.

Efficient concentration of the polycarbonate solution and vaporization of the residual contents of solvents at low temperatures is therefore of utmost importance for obtaining polycarbonates with improved optical properties.

There have been a variety of literature descriptions of the process for polycarbonate synthesis by the interfacial process, for instance in Schnell, "Chemistry and Physics of Polycarbonates", Polymer Reviews, Volume 9, Interscience Publishers, New York, London, Sydney 1964, pages 33-70.

In the interfacial process, a disodium salt of a biphenol (or of a mixture of different biphenols), initially charged in aqueous alkaline solution (or suspension), is phosgenated in the presence of an inert organic solvent or solvent mixture which forms a second phase. The oligocarbonates which form and are present principally in the organic phase are condensed with the aid of suitable catalysts to give high molecular weight polycarbonates dissolved in the organic phase. The organic phase is finally removed and washed in a multistage process in order to remove residues of sodium and catalyst. Typically, the organic phase contains, after the reaction, 10-20% by weight of polycarbonate.

The polycarbonate subsequently has to be isolated from the organic phase. The common processes for concentrating the polycarbonate solution and for isolating the polycarbonate are described in the patent literature and in textbooks, and are familiar to those skilled in the art. The isolation of the polycarbonate from the solution is preferably performed by vaporizing the solvent thermally or by means of vacuum. In order to directly obtain the melt phase after the vaporization of the solvent, this process requires the use of a high-boiling (>100° C.) solvent, for example chlorobenzene. In order to improve the solubility of the polymer in the solvent during the reaction, a mixture of one or more high-boiling solvents and the low-boiling dichloromethane is also used. The weight ratio of dichloromethane to the high-boiling solvent is typically about 1:1.

A further option consists in the injection of a heated gas, in particular steam, to drive out the volatile constituents. This involves spraying the polycarbonate solution with the carrier gas, and obtaining polycarbonate as a solid, in particular as a water-moist suspension. Other isolation methods are crystallization and precipitation, and the baking-out of the residues of the solvent in the solid phase. The latter process entails the use of dichloromethane as a solvent, it being possible to achieve residual contents of volatile solvent of about 2 ppm of dichloromethane.

However, residual contents of dichloromethane are particularly disruptive in the polycarbonate since dichloromethane is known to eliminate hydrochloric acid together with residual moisture in the processing operation, and can thus lead to discoloration of the polycarbonate and to corrosion on tools. At elevated temperatures, dichloromethane can also lead to losses of quality such as discoloration and gel formation in the workup operation.

In the known processes for vaporization, or else flash vaporization, polycarbonate solutions are repeatedly heated under slightly elevated pressure to temperatures above the boiling point and these superheated solutions are subsequently decompressed into a vessel, the pressure in the vessel being lower than that corresponding to the vapor pressure in the solution. The repetition of the process is generally favorable since the concentration of polycarbonate in the solution after the reaction is relatively low, and the repetition of the process allows significant overheating to be avoided. Common processes for the evaporation of polycarbonate solutions using apparatus are familiar to those skilled in the art. For example, the superheated solution can be decompressed into a heated helical tube which opens into a separator.

Above a particular concentration of polycarbonate (about 60% by weight), evaporation by flash vaporization becomes more difficult as a result of the high viscosities. Evaporation up to about 60% is referred to hereinafter as preliminary evaporation. It is generally favorable to remove the residual solvent with other processes, apparatuses and machines. These may be, for example, vented extruders or vertical tubular devolatilizers. At the last stage, it is also possible to use strand devolatilizers or foam devolatilizers in order to achieve particularly low residual contents.

In the evaporation of polycarbonate according to the prior art, usually excessively high apparatus temperatures and excessively long residence times of the melt in the apparatus are employed, with which there is sufficient removal of residual volatile constituents in the polycarbonate melt, but damage to the polycarbonate thus prepared occurs. This product damage is usually a direct consequence of excessive thermal stress over the course of excessive residence time of the polymer melt in the devolatilizing apparatus. In the course of this, side reactions occur on the polycarbonate, which cause a deterioration in the optical properties, especially the formation of defective structures, which usually only become visible in UV light in the moldings produced from such polycarbonate. Examples of such defective structures are ultrafine particles and gel bodies. In the processing of polycarbonate to give optical data carriers, for example CDs or DVDs, such defective structures in the end product cause a considerable loss of quality, which is intolerable and has to be avoided.

Concentrations of chlorobenzene-containing polycarbonate solutions are described in EP-A 1 265 944 and EP-A1 113 848, the examples of which describe the preparation of 65% by weight polycarbonate solutions. For removal of residual volatiles in the polycarbonate, in contrast to the subsequent process steps described therein, such polycarbonate solutions can also be evaporated further in vented extruders.

Vented or devolatilizing extruders are known in principle to those skilled in the art and are described, for example, in [1].

Characteristic features of devolatilizing extruders are what are called the devolatilizing domes or devolatilizing orifices. These are housings with orifices through which the vapors which form can escape. It is well known that different devolatilizing domes can be operated at different pressures when the product is backed up between the devolatilizing domes, such that a seal forms between the different pressures.

Such removals of residual volatiles from polycarbonate solutions with the aid of vented extruders are described in DE 29 08 352 and EP 1 165 302. In these two extruder processes, what is called backward devolatilization at the extruder inlet is described. In this case, an optionally preheated polymer solution is introduced into a twin-screw extruder and foams therein. The gases are then removed backward through the flights of the twin-screw extruder to a devolatilizing dome. In general terms, such backward devolatilization is prior art and is described, for example, in the textbook "Der gleichläufige Doppelschneckenextruder" [The Corotatory Twin-Screw Extruder], Klemens Kohlgrtiber, Carl Hanser Verlag, ISBN 978-3-446-41252-1, on pages 193-195. One disadvantage of backward devolatilization is a limitation in the amount of solvent evaporated off because the screw channels are relatively narrow and, as a result, high gas velocities are achieved, which can lead to entrainment of product into the backward devolatilizing dome. Thus, a relatively high proportion of residual solvent has to be evaporated out in the further stages of the extruder if 65 to 75% by weight polycarbonate solutions are introduced into these apparatuses and are to be concentrated down to a few ppm, based on the overall polycarbonate material, of residual solvent contents in the polycarbonate. Thermal damage to the polycarbonate may occur, for example yellowing, formation of insoluble constituents, specks, cleavage of the polymer chains, formation of residual monomers and other low molecular weight constituents, etc. It is also disadvantageous when a polycarbonate solution with residual contents of solvent, such as dichloromethane, is fed directly into an extruder, since the overheating of the solution, which is well known to the person skilled in the art, on the flights of the screw in the presence of, for example, dichloromethane can lead to local product damage and hence to discoloration of the overall product.

In addition, EP-A 027 700 discloses the combination of a flash devolatilizer with a vented extruder for concentration of the solutions from olefin polymerization, the flash stage being preceded by injection of stream as an entraining agent into the polymer melt stream. In the case of polycarbonate melts, water at elevated temperature can lead to polymer degradation by hydrolysis. Therefore, such a process is inadvisable for the removal of residual volatiles from polycarbonate melts. It is also stated therein that the product is "collected" in the devolatilizing vessel in the base of the apparatus, and is supplied to the extruder in contact with the base of the devolatilizing vessel, which leads to increased residence times of the polymer and hence to thermal damage.

JP 05017516 describes the use of a tubular vaporizer positioned directly atop the vented extruder for removal of residual volatiles from polymer solutions. The disadvantage of the process regime described here is that the vapors which form in the tubular vaporizer are not removed there, but rather are discharged via the devolatilizing orifices of the vented extruder, including via backward devolatilization. This process thus suffers from the same limitations resulting from high gas velocities in the narrow screw channels as the processes for pure backward devolatilization. The result is elevated shear forces in the extruder, which unavoidably leads to damaging temperature increases.

EP-A 1 510 530 outlines a process in which a polymer solution superheated in a heat exchanger with pressure retention is supplied to a vented extruder. The gases which form are then removed from the extruder by forward and backward devolatilization. This process thus suffers from the same limitations resulting from high gas velocities in the narrow screw channels as the processes for backward devolatilization, and from local superheating at the screw flights in the presence of dichloromethane. As shown by examples 60 to 65 in EP-A 1 510 530 for polycarbonate solutions, the residual solvent contents are sometimes well above 1000 ppm, which is intolerable for most applications.

EP 1 113 848 B1 described, for the last stage of the evaporation, a combination of pipe and strand devolatilizers. This involves first concentrating the polymer solution in a vertical shell-and-tube heat exchanger with downstream separator, proceeding from a solution containing 60% to 75% by weight of polycarbonate, to 98 to 99% by weight, and then concentrating it in a strand devolatilizer to residual contents of 5 to 500 ppm of chlorobenzene. In the case of use of a strand devolatilizer, the polymer melt is shaped to fine strands in a separator under reduced pressure and elevated temperature and thus freed of the solvent. The disadvantage of the strand devolatilizer technique is that effective devolatilization is ensured only by stable strands, meaning that they do not tear in the apparatus. The stability of the strands is influenced by the viscosity of the polymer solution. Too low a viscosity can lead to strand breaks. This leads to a restriction in the operating parameters with regard to temperature and inlet content of residual volatiles. In addition to the adverse influence on the viscosity, an excessive inlet concentration of volatiles directly has adverse effects on the success with which devolatilization can be achieved, since the mass transfer is determined purely by diffusion. The surface area for the mass transfer is, in contrast, fixed by the strand geometry. The requirement for a large area of the melt distributor required to obtain the strands additionally entails expensive, large apparatuses. These large apparatuses in turn inevitably have large areas which, in particular in the discharge, are flowed through by low flow rates. Such low flow rates lead to excessively long residence times of the polycarbonate close to the walls and induce unwanted changes in the polycarbonate there, such as discoloration and formation of gel.

It was therefore an object of the present invention to provide an apparatus and a process for devolatilizing solvent-containing polycarbonate solutions, in which the formation of such unwanted changes in the polycarbonate is avoided. More particularly, it was an object of the invention to improve the existing apparatus and the existing devolatilization process for polycarbonate solutions such that high polycarbonate melt temperatures with prolonged residence times are avoided and low residual solvent contents in the finished polycarbonate are nevertheless achieved.

The object is surprisingly achieved by performing a residual devolatilization with the aid of an apparatus combination of downpipe devolatilizer and vented extruder. Polycarbonate solutions containing aromatic chlorohydrocarbons, for example chlorobenzene, as a solvent are supplied to this apparatus combination; the polycarbonate melt passes through the downpipe devolatilizer as the first process stage and the vented extruder as the second, downstream process stage.

Preferably, this apparatus combination is designed such that the cone of the downpipe devolatilizer is arranged at right angles on one of the first housing of the vented extruder, and that at least 70%, preferably 100% of the cross section of the screws, open in the upward direction, is available as an inlet orifice for the melt falling downward out of the downpipe devolatilizer.

The invention thus provides an apparatus and a preparation process for removing volatile constituents from solvent-containing polymer melts, especially from polycarbonate melts comprising aromatic chlorohydrocarbons, with the aid of an apparatus combination of a heatable tubular devolatilizer and a vented extruder.

In a particularly preferred embodiment, this apparatus combination is designed with vapor lines such that the solvent-containing vapor formed in the downpipe devolatilizer is removed directly from the housing of the downpipe devolatilizer via the vapor lines.

In a further particularly preferred embodiment of the process according to the invention is injection and mixing of inert components, for example nitrogen, argon, carbon dioxide, water, methane or helium, or a mixture of one or more of these components, preferably nitrogen, as an entraining agent into the polymer melt stream upstream of the downpipe devolatilizer.

In a further particularly preferred embodiment of the process according to the invention, inert gas is injected as an entraining agent in one or more housings of the vented extruder.

The evaporation in the downpipe devolatilizer, said evaporation being upstream of the extruder, allows the speed of the extruder to be lowered and thus the temperature, and hence the product damage, to be reduced.

The downpipe devolatilizer used in accordance with the invention contains at least one heatable shell-and-tube heat exchanger which is arranged vertically on a separator and is connected directly thereto. The tubes of the shell-and-tube heat exchanger charged with polycarbonate melt open in an unrestricted manner into this separator, which is in turn connected in an unrestricted and unblockable manner via the lower cone directly to an extruder housing of the vented extruder, such that the concentrated polycarbonate melt leaving the shell-and-tube heat exchanger can pass directly into the vented extruder.

In a particularly preferred embodiment, the separator has, in the upper region, at least one exit orifice for removal of gaseous vapors, at least one separation vessel, on the base of which melt particles entrained by the vapor stream can separate out, and a vapor condensation unit. Beyond the condensation unit, a unit for vacuum generation with pressure regulation may be present.

In a preferred embodiment, the downpipe devolatilizer consists of a shell-and-tube heat exchanger. The polycarbonate solution is introduced through an exit orifice at the upper end of the downpipe devolatilizer and supplied via a distributor plate to a multitude of tubes which are heated from the outside. The heating is preferably effected by means of condensing steam, a condensing organic heat carrier, or a liquid organic heat carrier. Liquid organic heat carriers, for example oil, especially silicone oils of high thermal stability, are advantageously used when no other suitable heat carrier is available for a sufficiently high heating temperature, for instance when no steam of sufficiently high pressure is available. Use of oil as a heat carrier allows the heating temperature to be increased up to 360° C. if required, such that the polycarbonate solution can be concentrated further in the downpipe devolatilizer in the apparatus combination of downpipe devolatilizer with vented extruder described here. This is advantageous for the downstream process step in the vented extruder, since the residual solvent content of the polycarbonate solution at the inlet into the vented extruder is correspondingly lower, and the vented extruder can as a result be operated under gentler thermal conditions, which is ultimately to the benefit of the polycarbonate quality. Via the inner surface of the tubes, the thermal energy for vaporization of solvents is introduced into the polycarbonate melt. This vaporizes solvent fractions to form a biphasic gas-liquid mixture. In contrast to the prior art, overheating of the polymer melt is avoided here in a controlled manner. The vaporous solvent which escapes brings about constant mixing and surface renewal of the polycarbonate melt, which brings about the more efficient concentration thereof. In this way, a much more highly concentrated and colder polycarbonate melt is supplied to the vented extruder, such that both the energy introduction and the residence time of the polycarbonate melt in the extruder in order to bring about the same or even higher removal of residual volatiles in the polycarbonate melt can be lower. This melt is less thermally stressed as a result, such that the formation of unwanted by-products is distinctly reduced. The separate removal of the vapors from the downpipe devolatilizer additionally improves the overall performance of the vented extruder.

In a preferred embodiment, the inventive device is for devolatilization of polycarbonate solutions, preferably from the interfacial process, comprising at least one organic solvent. In the context of this application, the terms "polycarbonate solutions" and "polycarbonate melts" should be considered to be equivalent.

The polycarbonate solution comprises preferably 65-95% by weight of polycarbonate, based on the total weight of the polycarbonate solution.

The additional introduction of entraining gases both upstream of the downpipe devolatilizer and in the vented extruder further improves the degree of removal of residual volatiles in the polycarbonate melt in a gentle manner. The particularly volatile dichloromethane is almost completely removed in this way before it comes into contact with the shafts of the extruder, as a result of which the harmful influence of dichloromethane on the color is avoided.

In a specific embodiment of the polycarbonate residue devolatilization process according to the invention, the above-described combination of downpipe devolatilizer and vented extruder is preceded upstream by a further downpipe devolatilizer, into which a 55 to 80% by weight polycarbonate solution is introduced in a first process step and preconcentrated. The solution which has thus been preconcentrated to 70 to 95% by weight, preferably to 80 to 90% by weight, of polycarbonate is subsequently supplied to the above-described second downpipe devolatilizer which is connected directly to the vented extruder. In this way, it is possible to distribute the supply of the amount of heat required for vaporization of the volatile constituents in the polycarbonate solution over several apparatuses, and thus to select the apparatus temperatures such that overheating of the polycarbonate melt and the associated side reactions can be avoided.

In a particularly preferred embodiment, the downpipe devolatilizer preferably has a shell-and-tube heat exchanger with vertical heated tubes, with or without installed static mixers with an external diameter of 5 to 30 mm, preferably of 5 to 15 mm, of length 0.5 to 4 m, preferably of 1 to 2 m, and the throughput per heat exchanger tube through the tubes is 0.5 to 10 kg/h, preferably 3 to 7 kg/h, based on the polymer, and pressure in the separator is from 10 kPa to 0.5 MPa, preferably from 30 kPa to 0.3 MPa, more preferably from 70 kPa to 0.2 MPa. The heating temperature of the tubes is from 240° C. to 360° C., preferably from 250° C. to 340° C. and most preferably from 260° C. to 300° C. The material for the shell-and-tube heat exchanger should be resistant to corrosive attacks by dichloromethane and should not damage the polycarbonate. Preference is given to using a low-iron or iron-free material. Preference is given to nickel-based materials with iron contents less than 4% by weight, more preferably the alloys with materials numbers (according to Stahlschltüssel [Key to Steel] 2007, Verlag Wegst GmbH): 2.4605 (NiCr23Mo16Al) and 2.4610 (NiMo16Cr16Ti). The polymer concentration at the inlet into the extruder is between 80 and 99% by weight, preferably 90 to 99% by weight.

The vented extruder may be of single-shaft or multishaft design, preferably single-shaft, twin-shaft or four-shaft, most preferably twin-shaft. The design of a multishaft vented extruder may be co- or counter-rotatory, closely intermeshing or tangential, or, in the case of four or more shafts, a combination of closely intermeshing and tangential. Particular preference is given to the design as a closely intermeshing, corotatory twin-screw extruder.

In a preferred embodiment, it is possible, for example, to use screw elements for multishaft screw machines with pairs of corotatory screw shafts and pairs of screw shafts which scrape one another exactly, with two or more screw flights Z, with an axis separation A and external diameter DE, where the sum of the flight angles of one element pair is greater than 0 and less than $$2\pi - 4Z \arccos\left(\frac{A}{DE}\right).$$

Such screw elements are described, for example, in German Offenlegungschrift DE 10 2008 029305.9, which was yet to be published at the filing date.

In a further preferred embodiment, for example, it is also possible to use screw elements with pairs of corotatory screw shafts and pairs of screw shafts which scrape one another exactly, the generating and generated screw profile having a sequence of sealing region—transition region—channel region—transition region, one sealing region being a sequence of flight region—flank region—flight region, one channel region being a sequence of groove region—flank region—groove region, and one transition region being a sequence of screw profile regions which begins with a flank region and ends with a flank region. The regions of a screw profile equal to the outer screw radius are referred to as flight regions. The regions of a screw profile equal to the core radius are referred to as groove regions. The regions of a screw profile which are less than the outer screw radius and greater than the core radius as referred to as flank regions. Such screw elements are, for example, in German Offenlegungsschrift DE 10 2008 029306.7, which was yet to be published at the filing date. In a "flight region", the screw elements have their greatest diameter and clean the wall. In a "groove region", the screw elements have their smallest diameter. In a "transition region", the screw elements have neither their greatest nor their smallest diameter.

The devolatilizing zones may be configured with two or three flights, preferably two flights.

A high level of devolatilization can be achieved especially when, in accordance with a further preferred embodiment, the extruder has several devolatilizing zones in conveying direction, to each of which a suction unit is attached. Very good results were achieved with an extruder which, beyond its intake orifice, has four to five devolatilizing zones in conveying direction, wherein the absolute pressure generated at the devolatilizing orifice assigned to the first devolatilizing zone was preferably in the range from 50 to 150 kPa, the absolute pressure generated at the devolatilizing orifice assigned to the second devolatilizing zone was preferably in the range from 0.3 to 10 kPa, and the absolute pressure generated at the devolatilizing orifice assigned to the third and further subsequent devolatilizing zones was preferably in the range from 0.1 to 3 kPa, the pressure preferably decreasing in each step. Each of the devolatilizing zones preferably has a devolatilizing dome through which the vapors which form are removed. Between the different devolatilizing zones of the extruders are arranged backup zones in which a pressure drop is generated by neutral or backward-conveying elements, as a result of which the free cross section of the extruder is completely filled. This enables different pressures in the gas space of the devolatilizing zones. Preference is given to using kneading elements or backward-conveying screw elements for this purpose.

In a preferred embodiment, the devolatilization in the vented extruder can be positively influenced with an entraining agent which increases the devolatilization surface area. In the process according to the invention, the entraining agent is preferably added between the penultimate and the last devolatilizing zone in* conveying direction. The entraining agent used may preferably be nitrogen. The entraining agent is dispersed in a kneading zone. The volume flow of entraining agent supplied should preferably at a shaft speed of less than or equal to 390 rpm be preferably 0.05 to 0.3% by mass. Downstream of the devolatilizing zone, additives and optionally a stream of molten polymer are also added, which are mixed with the main stream in a pressure buildup zone. The pressure buildup and mixing zone may be of one-, two- or three-flight design, preference being given to a two- or three-flight design and particular preference to a three-flight design. The three-flight design is associated with a reduction in the diameter if the preceding devolatilizing section has been in two-flight design.

The thermoplastic polycarbonates obtainable by the process according to the invention have a residual content of volatile substances (solvents, especially monochlorobenzene) of not more than 2000 ppm, preferably from 20 to 1000 ppm and more preferably from 50 to 600 ppm, based on the polymer material. The residual dichloromethane content is not more than 2 ppm, preferably less than 1 ppm and more preferably less than 0.5 ppm (free of dichloromethane).

Diphenols suitable for the process according to the invention for preparation of polycarbonate have been described many times in the prior art.

Suitable diphenols are, for example, hydroquinone, resorcinol, dihydroxydiphenyl, bis(hydroxy-phenyl)alkane, bis (hydroxyphenyl)cycloalkanes, bis(hydroxyphenyl)sulfides, bis(hydroxyphenyl)ethers, bis(hydroxyphenyl)ketones, bis (hydroxyphenyl)sulfones, bis(hydroxyphenyl)sulfoxides, α,α'-bis(hydroxyphenyl)diisopropylbenzenes, and the alkylated, ring-alkylated and ring-halogenated compounds thereof.

Preferred diphenols are 4,4'-dihydroxydiphenyl, 2,2-bis(4-hydroxyphenyl)-1-phenylpropane, 1,1-bis(4-hydroxyphenyl)phenylethane, 2,2-bis(4-hydroxyphenyl)propane, 2,4-bis (4-hydroxy-phenyl)-2-methylbutane, 1,3-bis[2-(4-hydroxyphenyl)-2-propyl]benzene (bisphenol M), 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl)sulfone, 2,4-bis(3,5-dimethyl-4-hydroxyphenyl)-2-methylbutane, 1,3-bis[2-(3,5-dimethyl-4-hydroxyphenyl)-2-propyl]-30 benzene and 1,1-bis(4-hydroxyphenyl)-3,3,5-trimethylcyclohexane (bisphenol TMC).

Particularly preferred diphenols are 4,4'-dihydroxydiphenyl, 1,1-bis(4-hydroxy-phenyl)phenylethane, 2,2-bis(4-hydroxyphenyl)propane, 2,2-bis(3,5-dimethyl-4-hydroxy-phenyl)propane, 1,1-bis(4-hydroxyphenyl)cyclohexane and 1,1-bis(4-hydroxyphenyl)-3,3,5-trimethylcyclohexane (bisphenol TMC).

In the case of homopolycarbonates only one diphenol is used; in the case of copolycarbonates several diphenols are used; of course, the diphenols used, like all other chemicals and assistants added to the synthesis too, may be contaminated with the impurities originating from their own synthesis, handling and storage, although it is desirable to work with very substantially clean raw materials.

The monofunctional chain terminators required to regulate the molecular weight, for example phenol or alkylphenols, especially phenol, p-tert-butylphenol, isooctylphenol, cumylphenol, chlorocarbonic esters thereof, or acid chlorides of monocarboxylic acids, or mixtures of these chain terminators, are supplied to the reaction either with the bisphenoxide or the bisphenoxides, or else added at any other point in the synthesis, provided that phosgene or chlorocarbonic acid end groups are still present in the reaction mixture, or, in the case of the acid chlorides and chlorocarbonic esters as chain terminators, as long as sufficient phenolic end groups of the polymer which forms are available. Preferably, the chain terminator(s), however, is/are added after the phosgenation at a site or at a time where no phosgene is present any longer, but the catalyst is yet to be metered in. Alternatively, it can also be metered in before the catalyst, together with the catalyst or in parallel.

In the same way, branching agents or branching agent mixtures are optionally added to the synthesis. Typically, branching agents, however, are added before the chain terminators. In general, trisphenols, quaterphenols or acid chlorides of tri- or tetracarboxylic acids, or mixtures of the polyphenols or of the acid chlorides, are used. Some of the compounds which have three or more than three phenolic hydroxyl groups and are suitable as branching agents are, for example, phloroglucinol, 4,6-dimethyl-2,4,6-tri(4-hydroxyphenyl)heptene-2,4,6-dimethyl-2,4,6-tri(4-hydroxyphenyl) heptane, 1,3,5-tri(4-hydroxyphenyl)benzene, 1,1,1-tri(4-hydroxyphenyl)-ethane, tri(4-hydroxyphenyl)phenylmethane, 2,2-bis(4,4-bis(4-hydroxyphenyl)cyclohexyl)-propane, 2,4-bis(4-hydroxyphenylisopropyl)phenol, tetra(4-hydroxyphenyl)methane.

Some of the other trifunctional compounds are 2,4-dihydroxybenzoic acid, trimesic acid, cyanuric chloride and 3,3-bis(3-methyl-4-hydroxyphenyl)-2-oxo-2,3-dihydroindole.

Preferred branching agents are 3,3-bis(3-methyl-4-hydroxyphenyl)-2-oxo-2,3-dihydroindole and 1,1,1-tri(4-hydroxyphenyl)ethane.

The catalysts used with preference in the interfacial synthesis of polycarbonate are tertiary amines, especially triethylamine, tributylamine, trioctylamine, N-ethylpiperidine, N-methylpiperidine, N-i/n-propylpiperidine, quaternary ammonium salts such as tetrabutylammonium hydroxide, chloride, bromide, hydrogensulfate or tetrafluoroborate, tributylbenzylammonium hydroxide, chloride, bromide, hydrogensulfate or tetrafluoroborate, tetraethylammonium hydroxide, chloride, bromide, hydrogensulfate or tetrafluoroborate, and the phosphonium compounds corresponding to the ammonium compounds. These compounds are described in the literature as typical interfacial catalysts, and are commercially available and familiar to the person skilled in the art. The catalysts can be added to the synthesis individually, in a mixture or else alongside one another and successively, optionally also before the phosgenation, but preference is given to metered additions after the introduction of phosgene, unless an onium compound or a mixture of onium compounds is used as catalysts. In this case, preference is given to addition before the metered addition of phosgene. The catalyst(s) can be metered in in substance, in an inert solvent, preferably the solvent of the polycarbonate synthesis, or else as an aqueous solution, and in the case of the tertiary amines as the ammonium salts thereof with acids, preferably mineral acids, especially hydrochloric acid. In the case of use of several catalysts or the metered addition of portions of the total amount of catalyst, it is of course also possible to undertake different metering methods at different sites or at different times. The total amount of the catalysts used is 0.001 to 10 mol % based on moles of bisphenols used, preferably 0.01 to 8 mol %, more preferably 0.05 to 5 mol %.

The polycarbonate synthesis can be performed continuously or batchwise. The reaction can therefore be effected in stirred tanks, tubular reactors, pumped circulation reactors or stirred tank cascades, or combinations thereof. By using the mixing units already mentioned, it should be ensured that aqueous and organic phases separate as far as possible only when the synthesis mixture has reacted to completion, i.e. no longer contains any hydrolyzable chlorine of phosgene or chlorocarbonic esters.

After introduction of the phosgene, it may be advantageous to mix the organic phase and the aqueous phase for a certain time before any branching agent, if it has not been metered in together with the bisphenoxide, chain terminator and catalyst are added. Such a continued reaction time may be advantageous after each metered addition. These continued stirring times are 10 seconds to 60 minutes, preferably 30 seconds to 40 minutes, more preferably 1 to 15 minutes.

The organic phase may consist of solvent or mixtures of several solvents. Suitable solvents are chlorinated hydrocarbons (aliphatic and/or aromatic), preferably dichloromethane, trichloro-ethylene, 1,1,1-trichloroethane, 1,1,2-trichloroethane and chlorobenzene, and mixtures thereof. However, it is also possible to use aromatic hydrocarbons such as benzene, toluene, m/p/o-xylene, or aromatic ethers such as anisole alone, in a mixture with or in addition to chlorinated hydrocarbons. Another embodiment of the synthesis uses solvents which do not dissolve polycarbonate, but merely swell it. It is therefore also possible to use nonsolvents for polycarbonate in combination with solvents. The solvents used in the aqueous phase too may be soluble solvents such as tetrahydrofuran, 1,3/1,4-dioxane or 1,3-dioxolane when the solvent partner forms the second organic phase.

The completely reacted at least biphasic reaction mixture which contains at most traces (<2 ppm) of chlorocarbonic esters is left to stand for phase separation. The aqueous alkaline phase is possibly passed completely or partly back into the polycarbonate synthesis as an aqueous phase, or else sent to wastewater treatment, where solvent and catalyst components are removed and recycled. In another variant of the workup, after removal of the organic impurities, especially of solvents and polymer residues, and optional after the establishment of a particular pH, for example by adding sodium hydroxide solution, the salt which can be supplied, for example, to the chloralkalielectrolysis is removed, while the aqueous phase is optionally sent back to the synthesis.

The organic phase comprising the polycarbonate can then be purified to free it of all contaminations of alkaline, ionic or catalytic nature. The organic phase, even after one or more phase separations, still contains proportions of the aqueous alkaline phase in fine droplets, and the catalyst, generally a tertiary amine. The phase separations can optionally be promoted by virtue of the organic phase passing through settling tanks, stirred tanks, coalescers or separators, or combinations thereof, in which case water can optionally be metered in in each or some separation steps, under some circumstances using active or passive mixing units.

After this rough separation of the alkaline aqueous phase, the organic phase is washed once or more than once with dilute acids, mineral acids, carboxylic acids, hydroxycarboxylic acids and/or sulfonic acids. Preference is given to aqueous mineral acids, especially hydrochloric acid, phosphorous and phosphoric acid, or mixtures of these acids. The concentration of these acids should be in the range of 0.001 to 50% by weight, preferably 0.01 to 5% by weight.

In addition, the organic phase is washed repeatedly with demineralized or distilled water. The organic phase, optionally dispersed with portions of the aqueous phase, is removed after the individual wash steps by means of settling tanks, stirred tanks, coalescers or separators or combinations thereof, in which case the washing water can optionally be metered in between the wash steps using active or passive mixing units.

Between these wash steps or else after the washing, it is optionally possible to add acids, preferably dissolved in the solvent which forms the basis of the polymer solution. Preference is given here to using hydrogen chloride gas and phosphoric acid or phosphorous acid, which can optionally also be used as mixtures.

This purified solution is then supplied in the subsequent step to the inventive downpipe devolatilizer/vented extruder combination.

The polycarbonates obtained by the process according to the invention can be provided with the customary additives (e.g. assistance and reinforcing agents) to alter the properties. The addition of additives and admixtures serves to prolong the use time (e.g. hydrolysis or degradation stabilizers), to improve color stability (e.g. thermal and UV stabilizers), to simplify processing (e.g. demolding agents, flow assistants), to improve the use properties (e.g. antistats), to improve flame retardancy, to influence the visual impression (e.g. organic colorants, pigments) or to adjust the polymer properties to particular stresses (impact modifiers, finely divided minerals, fibrous substances, quartz flour, glass fibers and carbon fibers).

The invention will be explained in detail below with reference to FIG. 1, which shows a working example.

The polymer solution is supplied through a feed line 1 to the vertical shell-and-tube heat exchanger 2 which is open in the downward direction. The shell-and-tube heat exchanger is heated with heating medium which is supplied at 3 and removed at 4. At the end of the tubes, the polymer solution expands into the separation vessel 5 arranged directly above the extruder. The gas released is removed via the vapor line 6. The product falls directly into the intake zone 7 of the extruder and is supplied through a sealing zone 8 to the first devolatilizing zone 9 which has a devolatilizing dome 10. These are followed by further backup zones 8 and devolatilizing zones 9. Upstream of the last. devolatilizing dome, nitrogen is added via the addition point 12 in the kneading zone 11. At the addition point 13, additives and optionally molten polymer are also added, which are mixed with the polymer stream in the pressure buildup and mixing zone 14.

Figure 2:
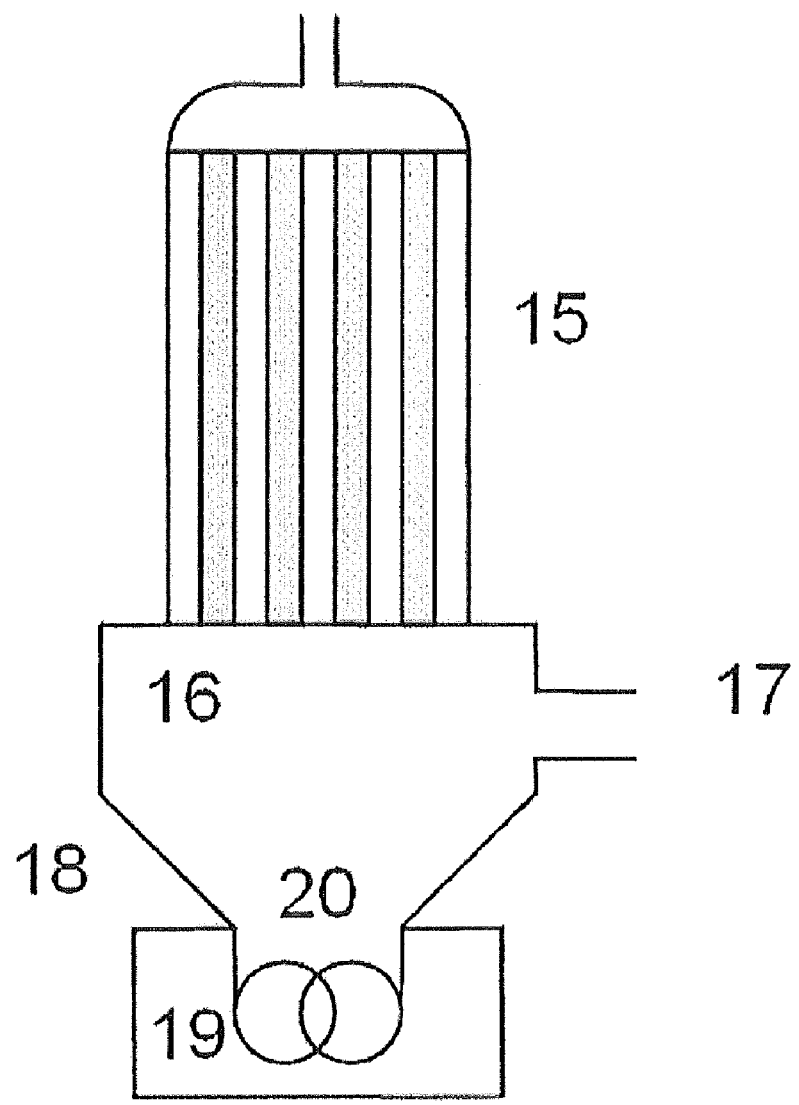

FIG. 2 shows a view of an inventive downpipe devolatilizer parallel to the shafts of the extruder. The polycarbonate solution is introduced from above into the vertical shell-and-tube heat exchanger (downpipe devolatilizer) 15 which is open in the downward direction and is heated there. The vapors are separated from the concentrated polymer solution in the separator 16. The vapors are supplied to the condensation through the vapor line 17. The concentrated polymer solution predominantly hits the extruder shafts 20 directly, and to a smaller degree the cone 18, whence it flows away to the extruder shafts under the action of gravity. The extruder shafts are arranged in the extruder housing 19 which is open at the top.

The examples which follow serve to illustrate the invention by way of example and should not be interpreted as a restriction.

EXAMPLES

The yellowness index YI was determined to ASTM E 313 on injection-molded samples of thickness 4 mm. The injection temperature was 300° C.

The relative viscosity is the ratio of the viscosity of a solution of 0.5 g of polycarbonate in 100 ml of dichloromethane to the viscosity of the pure solvent at 25° C.

Example 1

6.5 t/h of polycarbonate were isolated in an inventive apparatus from a solution of 65% by weight of polycarbonate, 33.5% by weight of chlorobenzene and 1.5% by weight of methylene chloride. The vented extruder used was designed as a closely intermeshing, corotatory twin-screw extruder and had a screw diameter of 178 mm, and a ratio of length of the extruder to the diameter of 48, and was of two-flight design in the intake zone and the devolatilizing zones. The downpipe devolatilizer consisted of 936 pipes of internal diameter 10 mm; the heating temperature of the downpipe devolatilizer was 280° C. In an entraining agent zone, 13 kg/h of nitrogen were supplied. The isolated polycarbonate had a relative viscosity of 1.295. The relative viscosity is the ratio of a solution of 0.5 g of polycarbonate in 100 ml of dichloromethane to the viscosity of the pure solvent at 25° C.

The residual chlorobenzene content in the isolated polycarbonate was 250 ppm and the dichloromethane content was below the detection limit of 0.5 ppm. The maximum temperature at the nozzle of the extruder was 394° C. The yellowness index of the polycarbonate was 1.57.

Comparative Example 2

6.5 t/h of polycarbonate were isolated in an extruder with backward devolatilization from a solution of 65% by weight of polycarbonate, 33.5% by weight of chlorobenzene and 1.5% by weight of methylene chloride. The vented extruder used was, analogously to the inventive example, designed as a closely intermeshing, corotatory twin-screw extruder and had a screw diameter of 178 mm, and a ratio of length of the extruder to the diameter of 48, and was of two-flight design in the intake zone and the devolatilizing zones. In an entraining agent zone, just as in the inventive example, 13 kg/h of nitrogen were supplied. The isolated polycarbonate had a relative viscosity of 1.295. The temperature of the polymer solution before the backward devolatilization was 185° C. No downpipe devolatilizer was used here.

The residual chlorobenzene content in the isolated polycarbonate was 410 ppm and the dichloromethane content was 0.5 ppm. The temperature at the nozzle of the extruder was 409° C.

The yellowness index of the polycarbonate was 2.3.

The invention claimed is:

1. An apparatus for devolatilizing solvent-containing polycarbonate melts, the apparatus comprising:
   a downpipe devolatilizer combined with
   a vented extruder, said downpipe devolatilizer being arranged directly above said extruder.

2. The apparatus as claimed in claim 1, further comprising vapor lines mounted on the downpipe devolatilizer.

3. The apparatus as claimed in claim 1, wherein the downpipe devolatilizer includes a shell-and-tube heat exchanger having a plurality of pipes which are heated from the outside.

4. The apparatus as claimed in claim 1, wherein the downpipe devolatilizer is heated by means of condensing steam, by means of a condensing organic heat carrier or by means of a liquid organic heat carrier.

5. The apparatus as claimed in claim 1, wherein the combination of the downpipe devolatilizer and the vented extruder is upstream of at least one further downpipe devolatilizer.

6. The apparatus as claimed in claim 1, wherein the vented extruder is of two- or four-shaft design.

7. The apparatus as claimed in claim 1, wherein the vented extruder comprises a closely intermeshing, corotatory twin-screw extruder.

8. The apparatus as claimed in claim 1, wherein the extruder comprises a plurality of devolatilizing zones in a conveying direction.

9. A process for devolatilizing polycarbonate solutions as claimed in claim 1, the process comprising:
   preparing a polycarbonate solution comprising at least one organic solvent and at least one polycarbonate by the interfacial process; and
   supplying the prepared polycarbonate solution to a downpipe devolatilizer in combination with a vented extruder, said downpipe devolatilizer being arranged directly above the extruder such that the polymer solution falls directly into the vented extruder.

10. The process as claimed in claim 9, further comprising removing solvent-containing vapors, formed in the downpipe devolatilizer, directly from the housing of the flash devolatilizer by means of vapor lines.

11. The process as claimed in claim 9, further comprising injecting inert gases as entraining agents into and mixed into a polymer melt stream upstream of the downpipe devolatilizer.

12. The process as claimed in claim 11, wherein the inert gas is injected as entraining agent in one or more housings of the vented extruder.

13. The process as claimed in claim 9, wherein the input concentration of the polycarbonate into the downpipe devolatilizer is between 60% by weight and 95% by weight.

14. The process as claimed in claim 9, wherein the polycarbonates obtained have a residual solvent content of 20 ppm to 1000 ppm.

* * * * *